US 6,430,172 B1

(12) United States Patent
Usui et al.

(10) Patent No.: US 6,430,172 B1
(45) Date of Patent: Aug. 6, 2002

(54) RADIO COMMUNICATION SYSTEM, TRANSMITTING APPARATUS, RADIO COMMUNICATION CONTROL APPARATUS, RECEIVING APPARATUS, AND RADIO COMMUNICATION METHOD

(75) Inventors: Takashi Usui, Tokyo; Hisaki Hiraiwa; Takehiro Sugita, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/139,887

(22) Filed: Aug. 25, 1998

(30) Foreign Application Priority Data

Aug. 27, 1997 (JP) .............................. 9-231173

(51) Int. Cl.[7] .................................. H04J 3/06
(52) U.S. Cl. ...................... 370/347; 370/337; 370/445
(58) Field of Search ................................ 370/445, 449, 370/328, 337, 338, 493, 494, 495, 347, 346, 348, 514, 509

(56) References Cited

U.S. PATENT DOCUMENTS

| 4,422,171 | A | * | 12/1983 | Wortley et al. ................ 377/32 |
| 4,736,371 | A | * | 4/1988 | Tejima et al. |
| 4,759,016 | A | | 7/1988 | Otsuka ........................ 370/95 |
| 4,882,730 | A | | 11/1989 | Shinmyo ...................... 370/95 |
| 5,276,703 | A | * | 1/1994 | Budin |
| 5,329,531 | A | * | 7/1994 | Diepstraten |
| 5,515,379 | A | * | 5/1996 | Crisler et al. |
| 5,521,925 | A | * | 5/1996 | Merakos et al. |
| 5,629,940 | A | * | 5/1997 | Gaskill ........................ 370/311 |
| 5,898,681 | A | * | 4/1999 | Dutta .......................... 370/229 |
| 6,011,784 | A | * | 1/2000 | Brown et al. ................ 370/329 |
| 6,026,082 | A | * | 2/2000 | Astrin ......................... 370/336 |
| 6,097,707 | A | * | 8/2000 | Hodzic et al. ............... 370/321 |

FOREIGN PATENT DOCUMENTS

EP 755164 6/1996

OTHER PUBLICATIONS

Proceedings of the IEEE Infocom '97, Crow, BP. et al., vol. 1, Apr. 1997, pp. 126–130.

* cited by examiner

*Primary Examiner*—Salvatore Cangialosi
*Assistant Examiner*—Ken Vanderpuye
(74) *Attorney, Agent, or Firm*—Jay H. Maioli

(57) ABSTRACT

A radio communication system where data is transferred by TDMA in one frame. A frame is formed of a control-data transfer time region and an information-data transfer time region. In the control-data transfer time region, polling is performed for each terminal and a transfer rate and whether transfer data exists are returned to a control station as an ACK. The control station assigns a channel to each terminal according to this information a time period for data transfer in the information-data transfer time region is assigned to each terminal which has made a transmission request. In the region, asynchronous data and isochronous data can be transferred together. Since data is transferred in the time period assigned in advance in a frame, a constant transfer rate is obtained without being affected by an increase or decrease of traffic.

19 Claims, 9 Drawing Sheets

RADIO COMMUNICATION SYSTEM, TRANSMITTING APPARATUS, RADIO COMMUNICATION CONTROL APPARATUS, RECEIVING APPARATUS, AND RADIO COMMUNICATION METHOD

BACKGROUND OF THE INVENTION

1. Field of the Invention

The present invention relates to a radio communication system, a transmitting apparatus, a radio communication control apparatus, a receiving apparatus, and a radio communication method suited to transfer asynchronous data and isochronous data among a plurality of terminals.

2. Description of the Related Art

As computers have become highly functional, it has been frequently performed that a plurality of computers are connected to form a local area network (LAN) in order to share files and data and to transfer data and electronic mail. In a conventional LAN, computers are connected by wire with the use of optical fibers, coaxial cables, or twisted pair cables.

In such a wired LAN, since connection work is required, it is difficult to form a LAN easily. In addition, cable wiring is troublesome in a wired LAN. Therefore, a radio LAN has drawn attention as a system which releases the user from wiring required for the conventional wired LAN. In this system, data collision is avoided by the use of carrier sense multiple access (CSMA) or polling when asynchronous data is transferred.

FIGS. 1A and 1B and FIGS. 2A to 2C roughly show radio data communication methods with the conventional technology. FIGS. 1A and 1B illustrate CSMA communication. Each communication apparatus formed of a personal computer and a communication unit senses whether a carrier signal is on a transfer path prior to communication. When there is no signal, the apparatus can start transmission. A communication apparatus "A" starts data transfer since there is not a carrier signal on the transfer path. On the other hand, since a communication apparatus "B" senses the carrier signal sent from the communication apparatus "A" on the transfer path, it does not transmit data. After a time "t" generated by a certain random number elapses, the communication apparatus "B" again senses a carrier signal. When there is no carrier signal on the path, the apparatus can transmit data. In CSMA, data may collide with each other on a transfer path. Therefore, each communication apparatus monitors a transfer path after data transfer, and if collision occurs, the data is again transmitted after a certain time period. A control station for controlling communication is not required in CSMA.

FIGS. 2A to 2C illustrate polling communication. In this method, a control station for controlling communication is provided to control communication by each communication apparatus constituting a system. The control station sequentially inquires of each communication apparatus whether it has data to be transmitted. In FIGS. 2A to 2C, a communication apparatus "a" is inquired of first. When the communication apparatus "a" has data to be transmitted, it transmits the data. After this transmission, the communication apparatus "b" is then inquired next. When it has data to be transmitted, it transmits the data. In this method, data does not collide with each other on a transfer path.

In recent years, it has been required that data, such as sound, music, and a motion picture, be transferred through such a radio LAN. Such data is usually large in size and needs to maintain continuity in time. When such data is to be transferred in the above conventional system, a data transfer rate may increase or decrease according to the increase or decrease of traffic in a transfer path.

When other data transfer is not performed and traffic is light on a transfer path, the specified transfer rate is ensured and transfer can be performed without any problems. If the traffic is heavy on the transfer path, however, a data delay becomes large and the transfer rate decreases. Therefore, to eliminate this delay, the receiving side needs to have a very large buffer. In some cases, data becomes intermittent. This means that reproduction of a motion picture or sound is paused.

SUMMARY OF THE INVENTION

Accordingly, an object of the present invention is to provide a radio communication system, a transmitting apparatus, a radio communication control apparatus, a receiving apparatus, and a radio communication method which suppress a delay time to a low level and ensure a constant transfer rate without being affected by an increase or decrease of communication traffic.

The foregoing object is achieved in one aspect of the present invention through the provision of a radio communication system including a plurality of radio communication terminals and a radio communication control terminal for controlling radio communication, including: radio communication means having transmitting means and receiving means; and radio communication control means having controlling means, transmitting means, and receiving means for controlling communication performed by the radio communication means, wherein asynchronous data and isochronous data is transferred through a radio communication path for communication among a plurality of the radio communication means.

The foregoing object is achieved in another aspect of the present invention through the provision of a radio communication method used between a plurality of radio communication terminals and a radio communication control terminal for controlling radio communication, wherein, when communication is performed among the plurality of radio communication terminals through a radio communication path, asynchronous data and isochronous data is transferred through the radio communication path.

As described above, asynchronous data and isochronous data can be transferred through a radio communication path with which communication is performed among a plurality of radio communication terminals.

The foregoing object is achieved in still another aspect of the present invention through the provision of a transmitting apparatus for transmitting information data in units of frames, including: means for requesting information-data transmission and for transmitting information related to the information data in a first time region of a frame; means for receiving information indicating whether communication according to the request is allowed and if the communication is allowed, for receiving information related to a second time region, in which communication is allowed, in the frame; and means for transmitting the information data in the second time region according to the information.

The foregoing object is achieved in yet another aspect of the present invention through the provision of a transmitting method for transmitting information data in units of frames, including the steps of: requesting information-data transmission and transmitting information related to the information data in a first time region of a frame; receiving information indicating whether communication according to the request is allowed and if the communication is allowed, receiving information related to a second time region, in which communication is allowed, in the frame; and transmitting the information data in the second time region according to the information.

As described above, since data is transferred in units of frames, a transmitting apparatus transmits a transmission request and information related to information data in a first region in a frame, and the transmitting apparatus transmits the information data in a second time region, in which communication is allowed, in the frame, the information data is transmitted at a constant transfer rate without being affected by an increase and decrease of traffic during communication.

The foregoing object is achieved in a further aspect of the present invention through the provision of a radio communication control apparatus for controlling information-data communication performed in units of frames among a plurality of radio communication terminals, including: means for receiving a transmission request of information data and for receiving information related to the information data in a first time region in a frame; determination means for determining whether transmission of the information data is allowed in a second time region in the frame, according to the received transmission request; and means for assigning the second time region to the transmission if the transmission is allowed according to the determination result of the determination means and for transmitting the assignment information, and if the transmission is not allowed, for transmitting information to that effect.

The foregoing object is achieved in a yet further aspect of the present invention through the provision of a radio communication control method for controlling information-data communication performed in units of frames among a plurality of radio communication terminals, including the steps of: receiving a transmission request of information data and receiving information related to the information data in a first time region in a frame; determining whether transmission of the information data is allowed in a second time region in the frame, according to the received transmission request; and assigning the second time region to the transmission if the transmission is allowed according to the determination result of in the determination step and transmitting the assignment information, and if the transmission is not allowed, transmitting information to that effect.

As described above, since a transmission request of information data and information related to the information data are received in a first time region in a frame, and a second time region is assigned to transmission of the information data according to these received pieces of information, control can be performed such that the information data is transmitted at a constant transfer rate without being affected by traffic during communication.

The foregoing object is achieved in a still further aspect of the present invention through the provision of a receiving apparatus for receiving information data in units of frames, including: means for receiving information related to a second time region in a frame, in which information data is transmitted, in a first time region in the frame; and means for receiving the information data according to the information related to the second time region.

The foregoing object is achieved in a yet still further aspect of the present invention through the provision of a receiving method for receiving information data in units of frames, including the steps of: receiving in a first time region of a frame information related to a second time region in the frame, in which information data is transmitted; and receiving the information data according to the information related to the second time region.

As described above, since information related to a second time region in a frame in which information data is transmitted in a first time region is received and information data is received according to the received information, the information data is received at a constant transfer rate without being affected by traffic during communication and a delay in receiving isochronous data is reduced.

According to the present invention, the radio communication control terminal for controlling information-data transfer is provided together with the radio communication terminals which transfer information data. The radio communication unit of the radio communication control terminal sets the time period required for information-data transfer by each radio communication terminal within one frame period. According to the present invention, since TDMA is performed in units of frame periods, a constant transfer rate is always ensured without being affected by an increase or decrease of communication traffic.

Since a constant transfer rate is always ensured, even when isochronous data such as motion-picture data and sound data is transferred, a delay time is suppressed to a low level and there is no need to provide a large-capacity buffer at the receiving side.

According to the present invention, since transfer can be performed with isochronous data and asynchronous data being placed together, data transfer with a higher degree of freedom is allowed.

DESCRIPTION OF THE PREFERRED EMBODIMENT

An embodiment of the present invention will be described below. In the present invention, data is transferred in units of frames, each frame being divided into a control-data transfer time region and an information-data transfer time region. In the control-data transfer time region, control information is transferred between a communication control station and each communication apparatus. According to a data transfer request from each communication apparatus obtained during the transfer, a data-transfer time region is assigned to each communication apparatus within the information-data transfer time region in a frame. In the information-data transfer time region, asynchronous-data and isochronous data are transferred. The asynchronous data includes program data and still-picture data, and the isochronous data specifies time information and includes motion-picture data and sound data. A plurality of data items are transferred within this information-data transfer time region by time division in a frame.

Figure 1A:
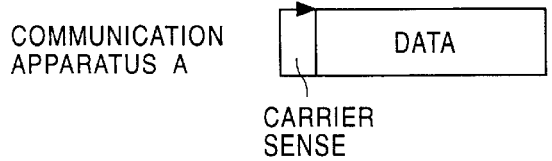
FIGS. 1A and 1B are views used for describing CSMA communication.
Figure 1B:
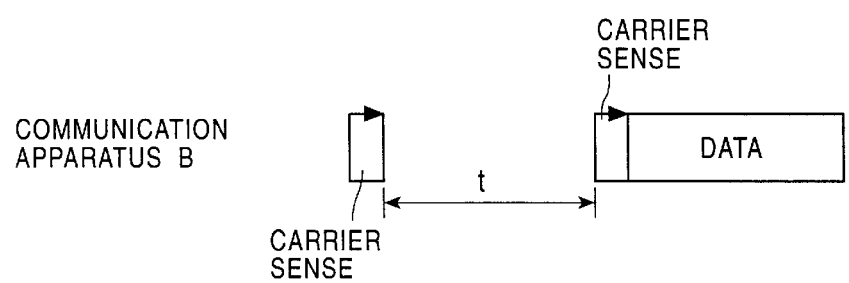
Figure 2A:
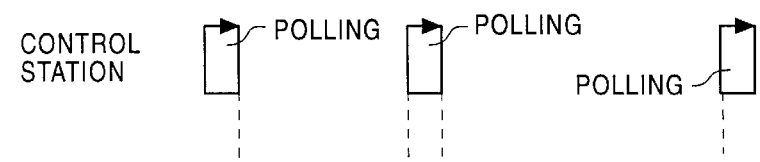
FIGS. 2A to 2C are views used for describing polling communication.
Figure 2B:
Figure 2C:
Figure 3:
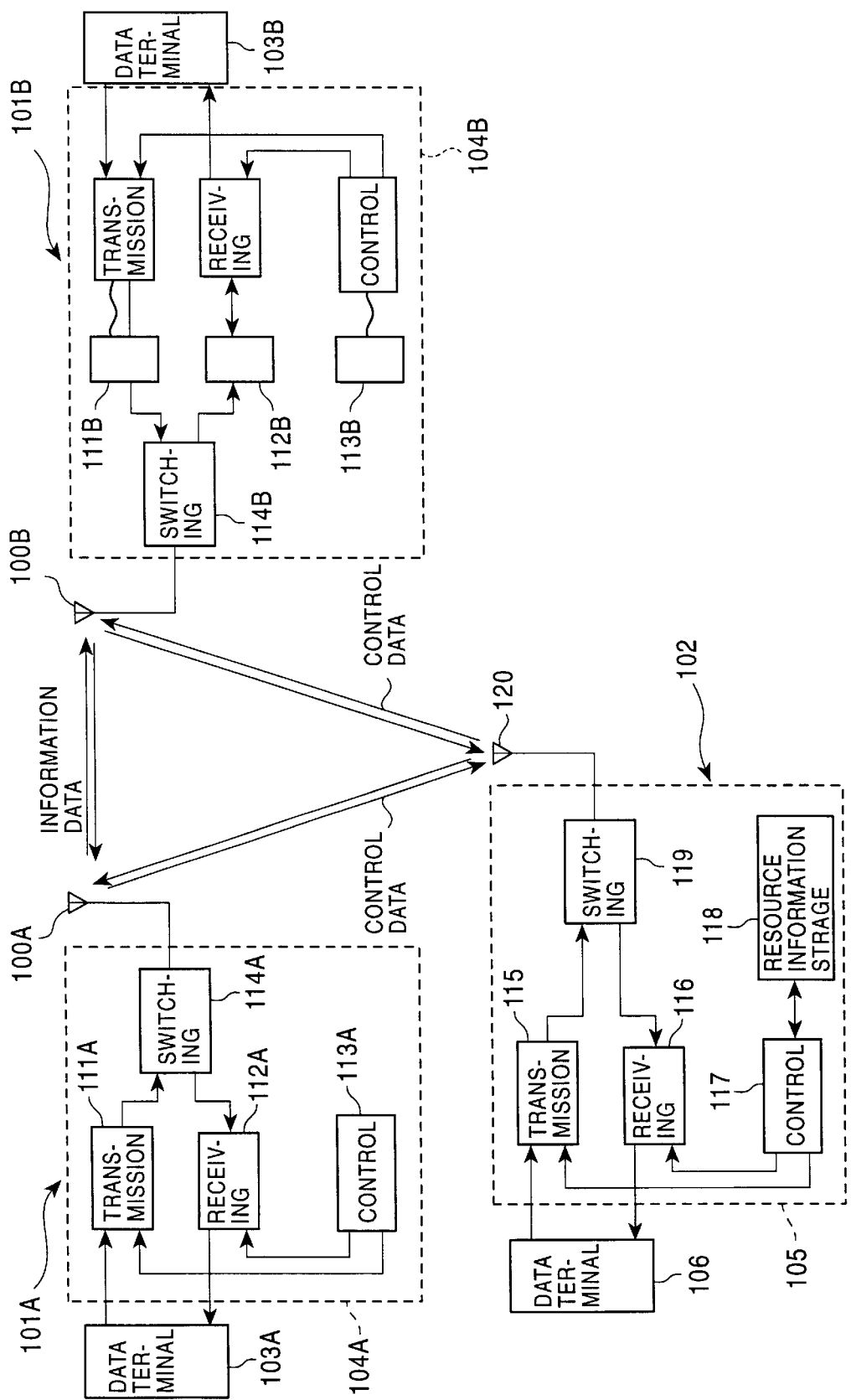
FIG. 3 is a block diagram showing outlines of a radio LAN system to which the present invention is applied.

FIG. 3 shows outlines of a radio LAN system to which the present invention is applied. The radio LAN system, to which the present invention is applied, includes a plurality of radio communication terminals 101A, 101B, . . . and a radio communication control terminal 102. The radio communication terminals 101A, 101B, . . . are formed of radio communication units 104A, 104B, . . . and data terminals 103A, 103B, such as computers, both of which are connected. A unique address is assigned to each of the radio terminals 101A, 101B, . . . The address may be assigned in advance when the system is configured, or may be dynamically assigned every time communication is performed. The radio communication control terminal 102 is formed of a radio communication unit 105 and a data terminal 106 both of which are connected. Detailed configuration of the radio communication units 104A, 104B, and 105 will be described later.

Between the plurality of radio terminals 101A, 101B, . . . , information data is transferred through antennas 100A and 100B. Control data is transferred between the radio communication control terminal 102 and the plurality of radio terminals 101A and 101B through the antennas 100A and 100B and an antenna 120 to control data communication between the radio terminals 101A, 101B, . . . The radio communication control terminal 102 can be configured only by the radio communication unit 105.

The radio communication units 104A, 104B, . . . in the radio communication terminals 101A, 101B, . . . are respectively formed of transmitting sections 111A, 111B, . . . , receiving sections 112A, 112B, . . . , and control sections 113A, 113B . . . The transmitting sections 111A, 111B, . . . and the receiving sections 112A, 112B, . . . are formed such that data communication can be performed by radio in the orthogonal frequency division multiplexing (OFDM) method. Switching circuits 114A and 114B switch between the transmitting sections 111A and 111B, and the receiving sections 112A and 112B.

The radio communication unit 105 in the radio communication control terminal 102 is formed of a transmitting section 115, a receiving section 116, and a control section 117. The transmitting section 115 and the receiving section 116 are formed such that data communication can be performed by radio in the OFDM method. A switching circuit 119 switches between the transmitting section 115 and the receiving section 116. The radio communication unit 105 in the radio communication control terminal 102 is provided with a resource-information storage section 118 for storing resource information related to the time period assigned to each radio communication terminal for data communication. This resource-information storage section 118 is formed, for example, of a memory.

In this system, data communication is performed by the OFDM method. One frame is formed, for example, of 147455 symbols (corresponding to four milliseconds) of the OFDM method, and data is transmitted in the frame in the time division multiple access (TDMA) method.

At the top of one frame, the radio communication unit 105 in the radio communication control terminal 102 transmits an M-sequence code for acquiring synchronization. The radio communication units 104A, 104B, . . . in the radio communication terminals 101A, 101B, . . . receive the M-sequence code for acquiring synchronization and set the timing of data transmission and receiving with this receiving timing being used as a reference.

When the radio communication terminals 101A, 101B, . . . have data communication requests, the radio communication units 104A, 104B, . . . in the radio communication terminals 101A, 101B, . . . send transmission requests to the radio communication unit 105 in the radio communication control terminal 102. According to the transmission requests and the resource information, the radio communication unit 105 in the radio communication control terminal 102 determines the transmission time periods assigned to the radio communication terminals 101A, 101B, . . . , and sends control information, including the transmission time periods, to the radio communication units 104A, 104B, . . . of the radio communication terminals 101A, 101B, . . . The radio communication units 104A and 104B of the radio communication terminals 101A and 101B perform data transmission and receiving according to the assigned transmission time periods. Data is transmitted or received with the M-sequence code for acquiring synchronization being used as a timing reference, which is sent at the top of a frame.

Figure 4A:
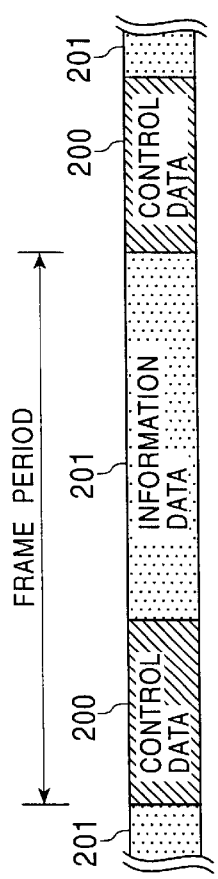
FIGS. 4A to 4C are views showing frame structures.
Figure 4B:
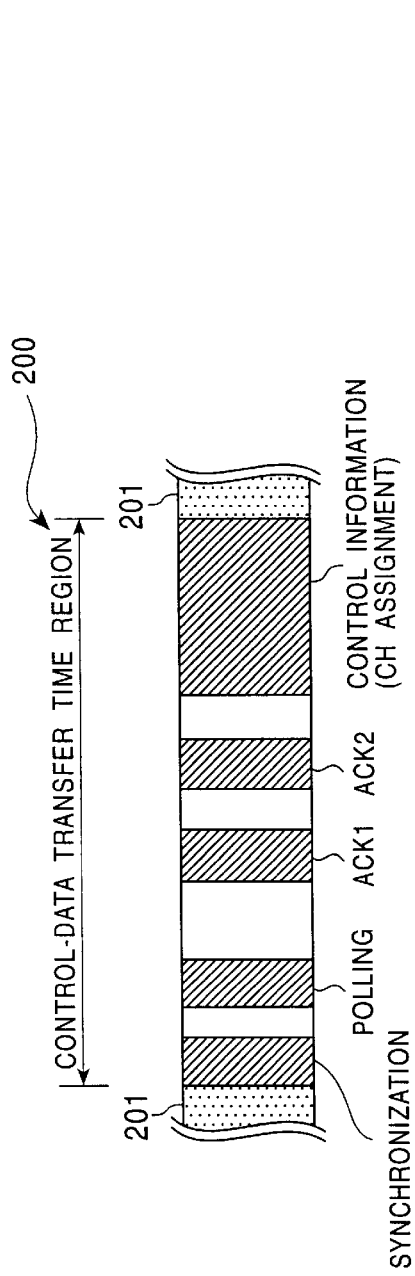
Figure 4C:
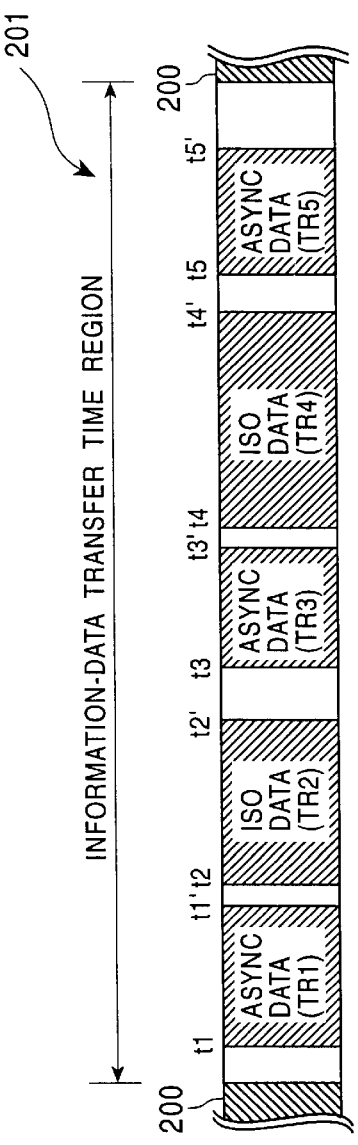

FIGS. 4A to 4C show a configuration of a frame. As shown in FIG. 4A, one frame is formed of a control-data transfer time region 200 and an information-data transfer time region 201. In the control-data transfer time region 200, the M-sequence code for acquiring synchronization is disposed and communication information is transferred between the radio communication unit 105 in the radio communication control terminal 102 and the radio communication units 104A, 104B, . . . in the radio communication terminals 101A, 101B, . . . According to the information obtained by this transfer, a data transfer time is specified to each data in the information-data transfer time region 201 for the radio communication units 104A, 104B, . . . which have had transmission requests, and a data-transfer channel is assigned.

As described above, a data transfer time is specified to each data in the information-data transfer time region 201 to keep a resource for data transfer. When transfer of information data is finished, the resource is released and it can be used for another data transfer.

In the above embodiment, the control-data transfer time region 200 and the information-data transfer time region 201 are definitely separated. Their relationship is not limited to this condition. The control-data transfer time region 200 and the information-data transfer time region 201 may be, for example, overlapped. In this case, the radio communication unit 105 receives a transmission request from the radio communication units 104A, 104B, . . . at any time, and assigns a data transfer time in units of frames according to the received transmission request.

FIG. 4B shows a configuration of the control-data transfer time region 200 in details. The M-sequence code for acquiring synchronization is disposed at the top. The radio communication unit 105 in the radio communication control terminal 102 performs polling to the radio communication units 104A, 104B, . . . of the radio communication terminals 101A, 101B, . . . Polling may be performed at the same time to all terminals constituting the system. Alternatively, it is sequentially performed to each terminal. The radio communication units 104A, 104B, . . . of the radio communication terminals 101A, 101B, . . . send acknowledgments (ACK1 and ACK2) to the radio communication unit 105 of the radio communication control terminal 102 in response to the polling.

An acknowledgment is formed of a transmission request from the radio communication units 104A, 104B, . . . of the radio communication terminals 101A, 101B, . . . The transmission request includes the address of the source terminal which will perform transmission and the address of the transmission destination. In addition, it includes region request information, such as the size of data to be transmitted and a data rate. It may include identification information indicating whether the data to be transferred is asynchronous data or isochronous data.

According to the acknowledgment sent in this way, the radio communication unit 105 of the radio communication control terminal 102 generates control information for channel assignment. This control information is sent to the radio communication units 104A, 104B, . . . of the radio communication terminals 101A, 101B, . . . which have sent transmission requests. The radio communication terminals 101A, 101B, . . . transfer data at the specified time region according to this control information.

In the above case, the radio communication unit 105 performs polling to each of the radio communication units 104A, 104B, . . . in the control-data transfer time region 200 and receives acknowledgments. The procedure is not limited to that in this case. Polling may be omitted in a small system or if data collision is avoided in an appropriate method.

In the above case, the M-sequence code for acquiring synchronization is disposed at the top of the control-data transfer region 200. The position of the code is not limited to this position. Since frames are continuously transmitted, the M-sequence code for acquiring synchronization can be disposed at a different position in the control-data transfer region. Furthermore, instead of the M-sequence code, other sequence codes, such as a Gold-sequence code, Barker-sequence code, and Kasami code, can be used for acquiring synchronization.

FIG. 4C shows a configuration of the information-data transfer time region 201 in detail. In this case, five radio communication terminals TR1, TR2, TR3, TR4, and TR5 send transmission requests and data transfer is performed. In the information-data transfer time region 201, the time period from a time $t_1$ to a time $t_1'$ is assigned to the terminal TR1. In the same way, the time period from a time $t_2$ to a time $t_2'$ is assigned to the terminal TR2, the time period from a time $t_3$ to a time $t_3'$ is assigned to the terminal TR3, the time period from a time $t_4$ to a time $t_4'$ is assigned to the terminal TR4, the time period from a time $t_5$ to a time $t_5'$ is assigned to the terminal TR5. Each of the terminals TR1, TR2, TR3, TR4, and TR5 acquires synchronization by the M-sequence code disposed at the top of the control-data transfer time region, sets a timer, and performs data transfer at the assigned time region.

In the information-data transfer time region 201, as shown in FIG. 4C, asynchronous data (indicated by ASYNC data) and isochronous data (indicated by ISO data) can be sent together. It is preferred that a series of isochronous data be transferred at substantially the same time region in each frame, that is, at substantially the same position in each frame. Since a transfer time region is specified in advance in a frame for each transfer data, a stable transfer rate is ensured.

In FIG. 4C, the asynchronous data and the isochronous data are used together in the information-data transfer time region 201. The data types used are not limited to this case. Only asynchronous data, or only isochronous data may be transferred. In the above case, a plurality of radio communication terminals perform transmission in the time region. The way of transmission is not limited to this type. Transmission from one radio communication terminal may be exclusively performed.

In FIG. 4C, the asynchronous data is disposed at any positions in the information-data transfer time region 201. The position of asynchronous data is not limited to this position. It can be configured, for example, that a region for transferring asynchronous data is specified in advance at a certain position in the region 201 and asynchronous data is first disposed at that region. In this case, it is preferred that when many pieces of isochronous data are requested to be transmitted, isochronous data be able to be disposed at this region for asynchronous data.

By referring to FIGS. 5 to 7, transmission and receiving at the radio communication units 104A, 104B, . . . in the radio communication terminals 101A, 101B, . . . , and an operation of the radio communication unit 105 of the radio communication control terminal 102 will be described below. A case will be taken in which the radio communication terminal 101A (that is, radio communication unit 104A) transmits information data to the radio communication terminal 101B (that is, radio communication unit 104B).

Figure 5:
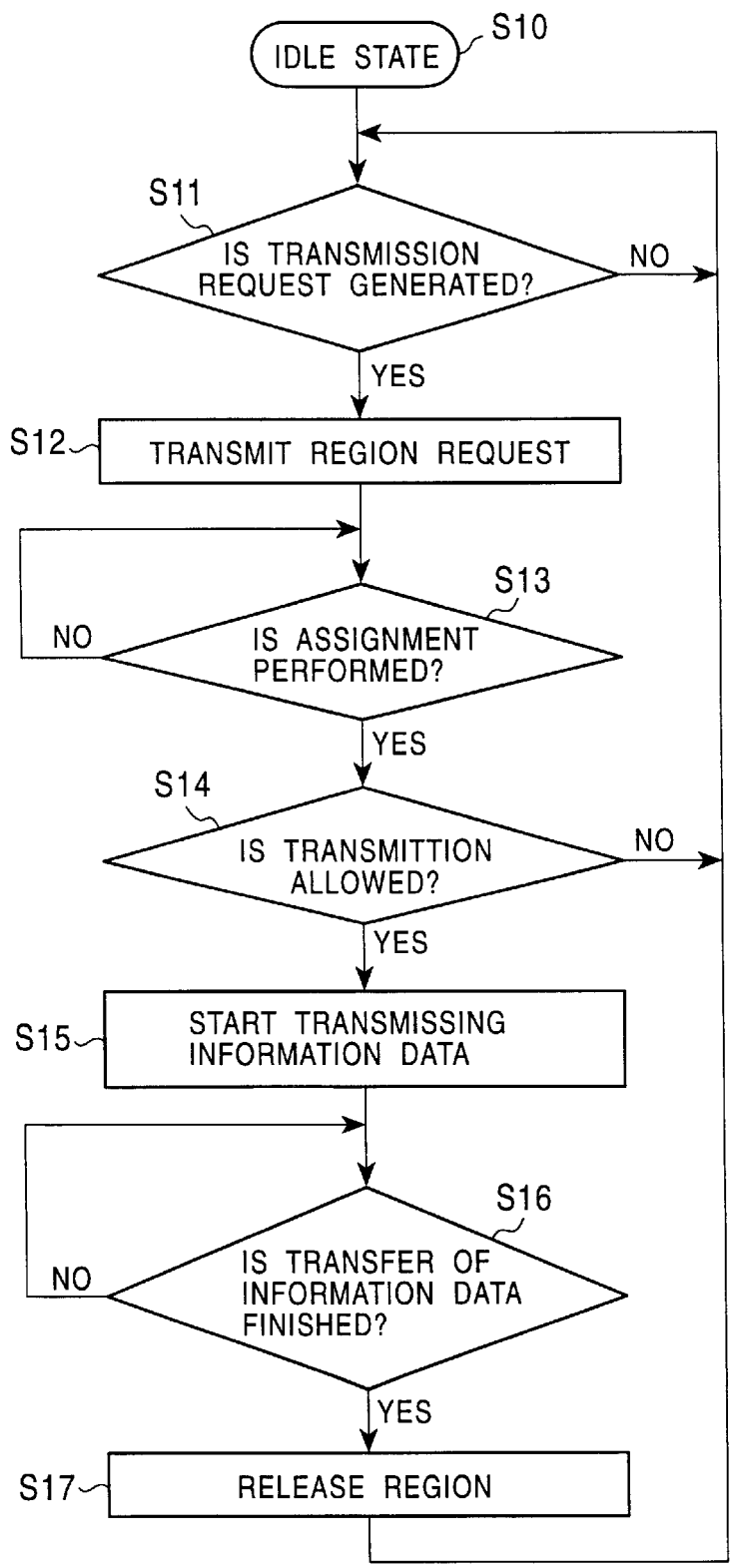
FIG. 5 is a flowchart of transmission processing according to the present invention.

FIG. 5 is a flowchart of transmission in the radio communication unit 104A. The radio communication unit 104A is first set to an idle state (step S10), and frame synchronization is achieved at a constant interval. The unit 104A waits for a transmission request from the radio communication terminal 101A (step S11). When the radio communication terminal 101A sends a transmission request to the radio communication unit 104A, the processing proceeds to a step S12.

In the step S12, according to the transmission request sent from the radio communication terminal 101A, a region request is sent to the radio communication unit 105 in the radio control terminal 102 (hereinafter called just the radio communication unit 105). The radio communication unit 105 determines whether the requested data transfer time can be ensured in the information-data transfer region 201 according to this transmission request and sends a notice based on this determination to the radio communication unit 104A, which will be described later. In a step S13, the radio communication unit 104A receives this notice, and determines whether transmission is allowed in the next step S14. If it is determined that transmission is not allowed due to, for example, a lack of the data transfer time region, the processing is returned to the step S11.

When it is determined in the step S14 that transmission is allowed, the radio communication unit 104A starts transmitting information data, that is, data transfer, to the transmission destination, the radio communication unit 104B, in the next step S15. The region-assignment notice sent from the radio communication unit 105 includes, for example, the data transfer start time $t_1$, which has been assigned to the radio communication unit 104A in the information-data transfer time region 201. According to this time $t_1$, information data is transferred. This notice may include the data transfer end time $t_1'$.

When the transfer of information data is completed (step S16), the radio communication unit 104A sends a region release notice to the radio communication unit 105 to inform that the transfer of the information data has been finished. This notice may be formed of a code specified in advance. Alternatively, without sending a special code, information indicating that the transfer of the information data has been finished may be sent as this notice. Receiving this notice, the radio communication unit 105 releases the region used for the transfer.

Figure 6:
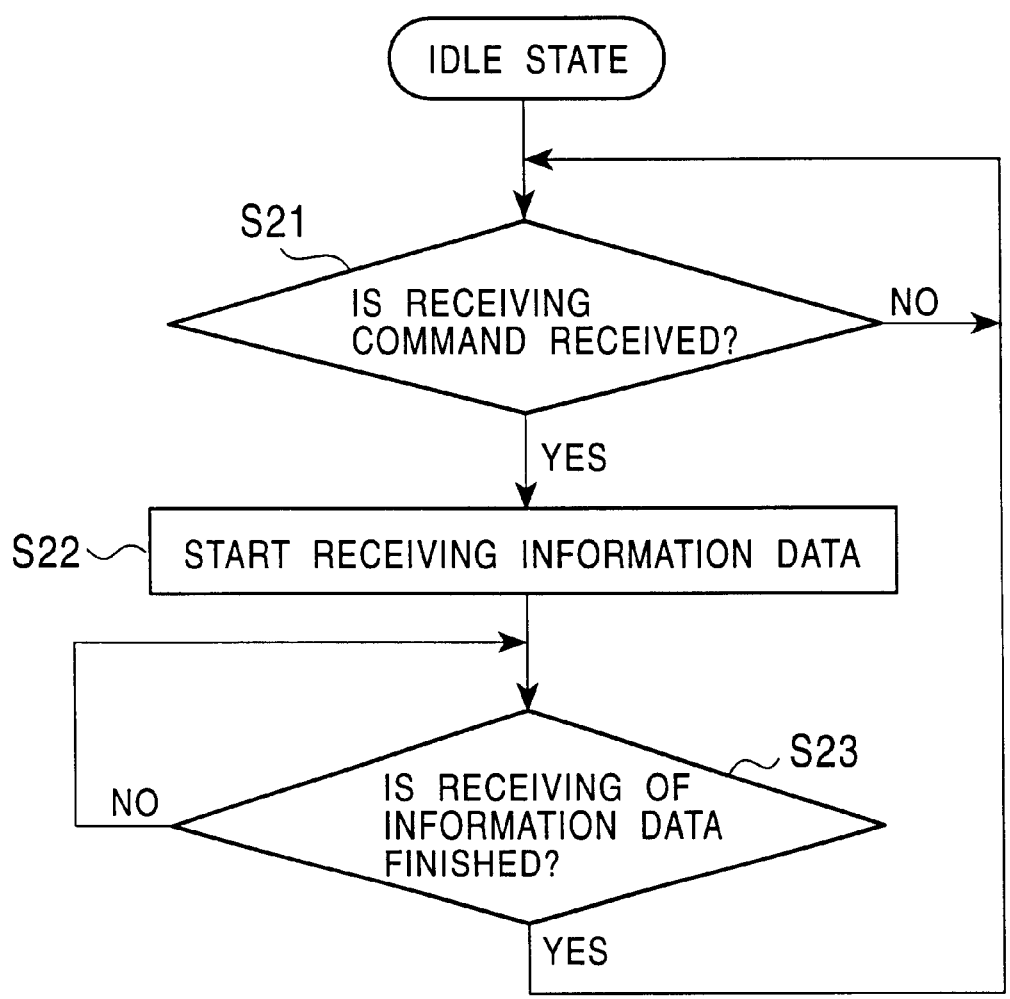
FIG. 6 is a flowchart of receiving processing according to the present invention.

FIG. 6 is a flowchart of receiving in the radio communication unit 104B, which corresponds to the flowchart of transmission shown in FIG. 5. The radio communication unit 104B is first set to an idle state (step S20), and frame synchronization is achieved at a constant interval. When the radio communication unit 104B receives a receiving command sent from the radio communication unit (step S21), the unit 104B starts receiving information data in a step S22. The receiving command includes time information (for example, an information-data transfer start time $t_1$) indicating the transfer time region of the information data to be sent to the radio communication unit 104B. According to this time, the information data is received.

When receiving of the information data is finished, the processing is returned to the step S21. The radio communication unit 104B is set to a condition in which the unit waits for a receiving command sent from the radio communication unit 105. The receiving end, which corresponds to the transmission flowchart is determined by receiving, for example, a special code sent from the transmission source, the radio communication unit 104A. The receiving end may be set when information-data transfer is stopped.

Figure 7:
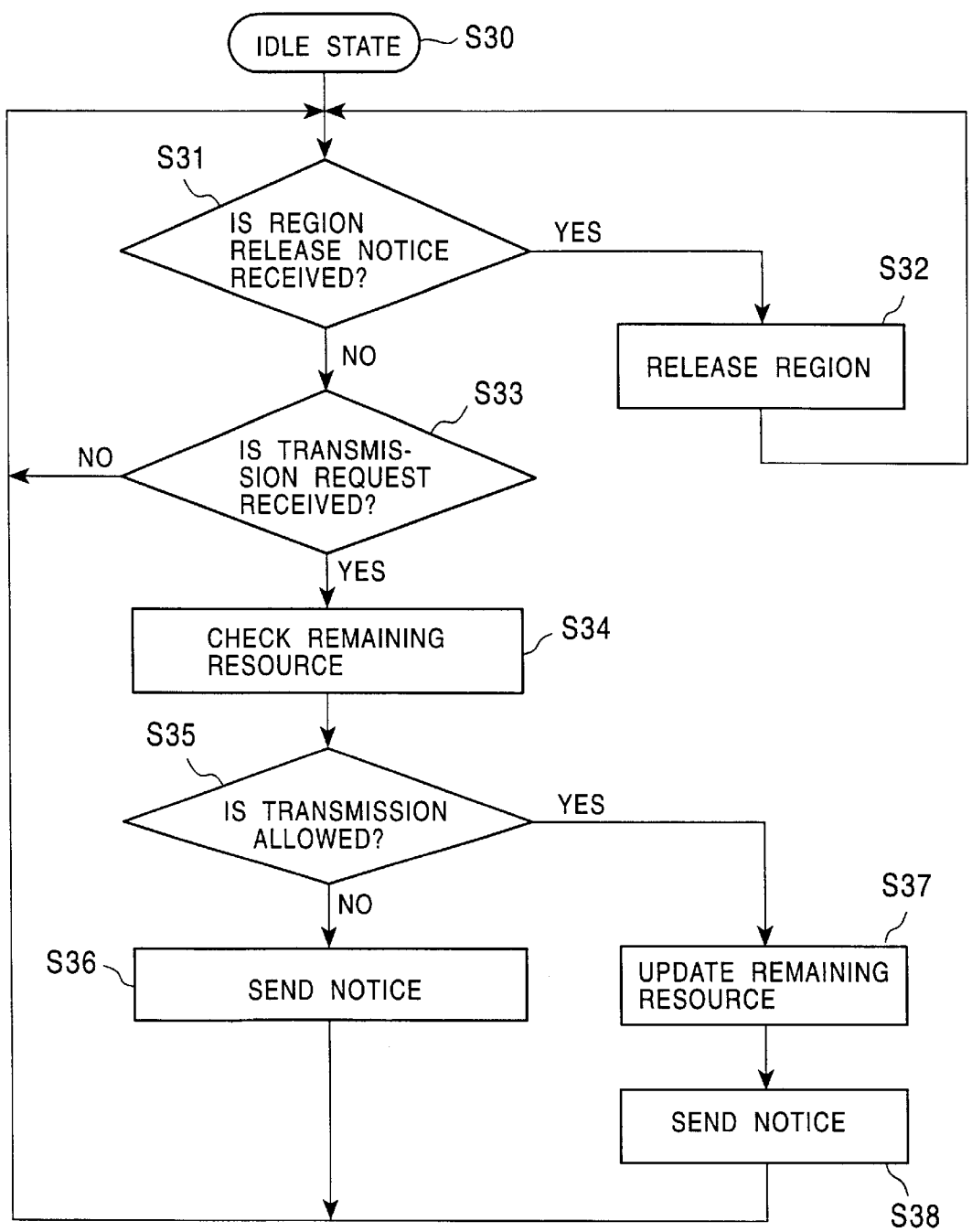
FIG. 7 is a flowchart of communication control processing according to the present invention.

FIG. 7 is a flowchart of a radio communication control operation in the radio communication unit 105. This flowchart is mainly formed of processing performed in the control-data transfer time region 200. The unit 105 is first set to an idle state (step S30), and the M-sequence code is transmitted at a frame interval for synchronization acquisition. In the next step S31, the unit 105 is set to a condition in which it waits for a region release notice to be sent from the radio communication unit which had transmitted information data. When the radio communication unit 105 receives the region release notice sent from the radio communication unit 104A, for example, the processing proceeds to a step S32. The information-data transfer region specified for the radio communication unit 104A is released.

With this region release, the resource kept for the information-data transfer of the radio communication unit 104A in the information-data transfer time region 201 is returned. Resource information formed of, for example, the information of radio communication units performing transmission and receiving, and transfer-time information is stored in the resource-information storage section 118. Among the stored resource information, the related information is deleted to release the region. Thus, the resource is returned.

On the other hand, if a region release notice is not received in the step S31, the processing proceeds to a step S33, and it is determined whether a transmission request from the radio communication units 104A, 104B, . . . has been received. This is determined, for example, according to acknowledgments returned when the radio communication unit 105 performs polling to the radio communication units 104A, 104B, . . . A radio communication unit which will transfer information data transmits information related to the information data as a transmission request such as the data rate of the information data to be transferred, the number of bits to be transferred per frame, and the time required for the transfer.

According to this transmission request the remaining resource is checked in a step S34. With this checking, whether the information-data transfer time region 201 has a sufficient time period for transferring the data required by the transmission request is checked. According to this check result it is determined in the next step S35 whether the data required by the transmission request is allowed to be transferred.

If the information-data transfer time region 201 has an insufficient time period for transferring the data required by the transmission request and it is determined that data transfer is not allowed, a communication-not-allowed notice is sent to the corresponding radio communication unit in a step S36, indicating that the information data is not allowed to be transferred.

On the other hand, when it is determined in the step S35 that transmission is allowed, the processing proceeds to a step S37. The resource information stored in the resource-information storage section 118 is changed and the remaining resource is updated. In the next step S38, a communication-allowed notice is sent to the corresponding radio communication unit, indicating that the information data is allowed to be transferred. This communication-allowed notice includes the transfer-time information assigned in the information-data transfer time region 201.

In the above case, the processes corresponding to the flowcharts shown in FIGS. 5 to 7 are separate ones. These processes can be performed in parallel to each other.

Figure 8:
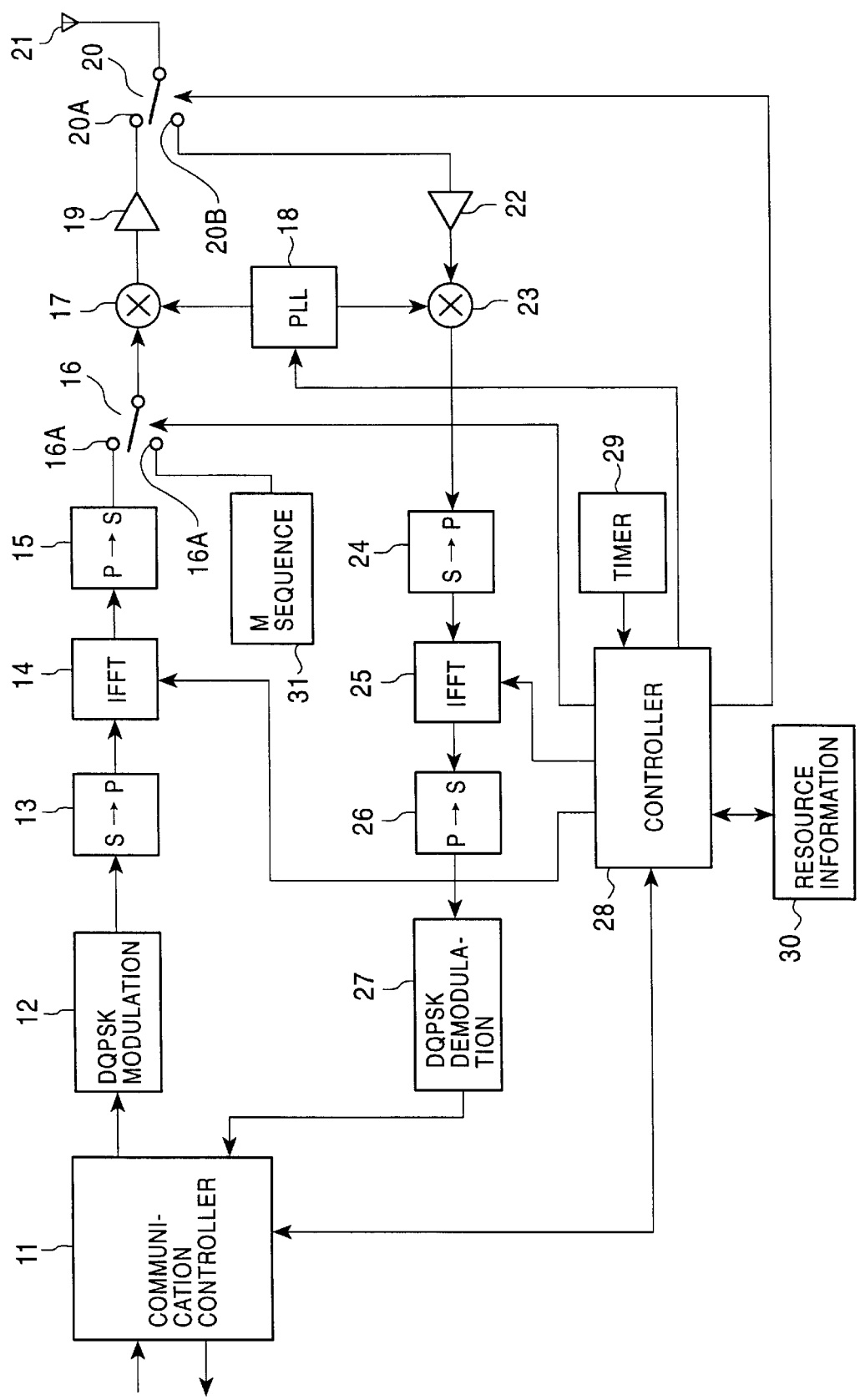
FIG. 8 is a block diagram showing a configuration of a radio communication unit in a radio communication control terminal.

Configurations of the radio communication units 104A, 104B, and 105 will be described below in detail. FIG. 8 shows a configuration of the radio communication unit 105 in the radio communication control terminal 102. In FIG. 8, there is shown a communication controller 11. Through this communication controller 11, data is transferred with a data terminal.

Data to be transmitted, sent from the controller 11 is supplied to a differentially encoded quadrature phase shift keying (DQPSK) modulation circuit 12. The DQPSK modulation circuit 12 modulates the data to be transmitted by DQPSK.

The output of the DQPSK modulation circuit 12 is sent to a serial/parallel conversion circuit 13. The serial/parallel conversion circuit 13 converts serial data to parallel data. The output of the serial/parallel conversion data is sent to an inverse fast Fourier transform (IFFT) circuit 14. The IFFT circuit 14 performs mapping from the data to be transmitted to data in the frequency domain, and applies inverse Fourier transform to convert to data in the time domain. The output of the IFFT circuit 14 is sent to a parallel/serial conversion circuit 15.

The serial/parallel conversion circuit 13, the IFFT circuit 14, and the parallel/serial conversion circuit 15 converts to a multi-carrier signal by the OFDM method. In the OFDM method, with the use of a plurality of sub carriers formed orthogonally at a frequency interval $f_0$ such that inter-code interference does not occur, a low-bit-rate signal is assigned to each sub carrier to obtain a high bit rate as a whole.

Figure 9:
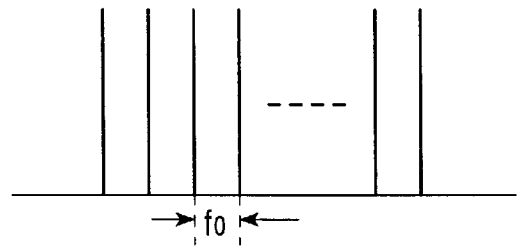
FIG. 9 is a view showing a spectrum of a transfer waveform in the OFDM method.

FIG. 9 illustrates the spectrum of transfer waveforms in the OFDM method. As shown in FIG. 9, a signal is transferred with the use of sub carriers orthogonal to each other at a frequency interval $f_0$ in the OFDM method.

In OFDM, signal generation is performed by mapping the signal to be transmitted onto the frequency domain and converting it from the frequency domain to the time domain by IFFT. Conversely, demodulation is performed by taking a received waveform at an interval of $f_0$ and converting the signal on the time domain into the signal in the frequency domain by FFT.

Figure 10:
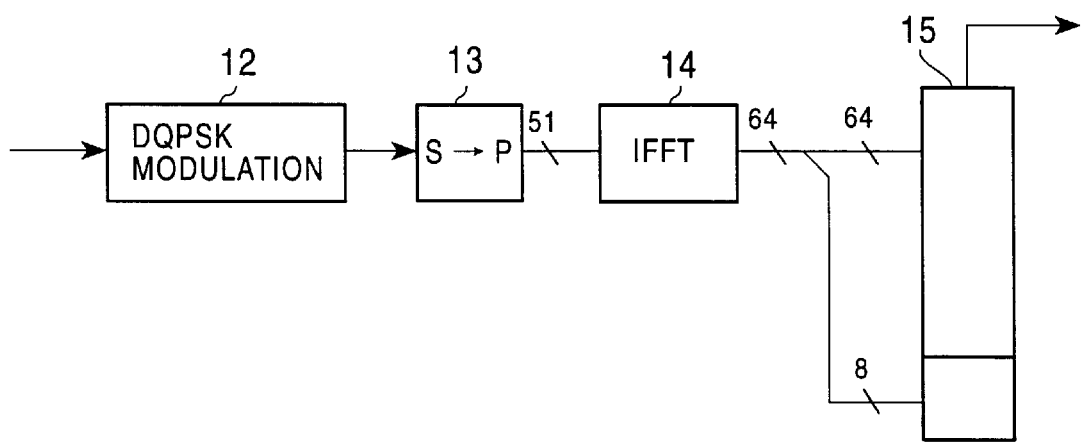
FIG. 10 is a view used for describing signal generation in the OFDM method.

In the above case, as shown in FIG. 10, the serial/parallel conversion circuit 13 converts 51 samples, which are the output of the DQPSK modulation circuit 12, to parallel data, and maps onto the frequency domain. The output of the serial/parallel conversion circuit 13 is converted to data in the time domain by the IFFT circuit 14. The IFFT circuit 14 outputs an effective symbol with 64 samples. A guard interval of eight symbols is added to this effective symbol with the 64 samples.

Figure 11:
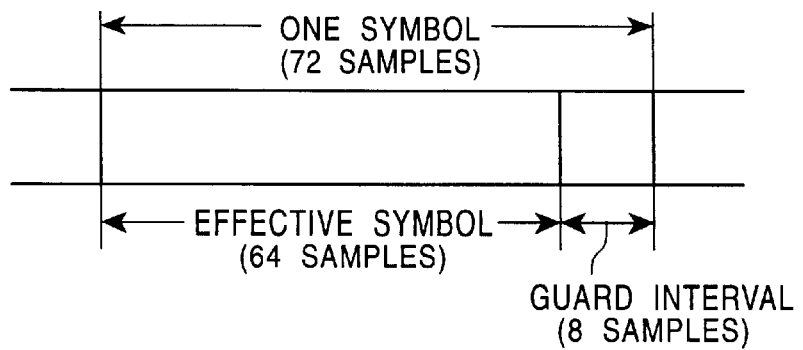
FIG. 11 is a view used for describing one symbol in a signal in the OFDM method according to an embodiment of the present invention.

Therefore, in this case, as shown in FIG. 11, one symbol, which has 72 samples, is formed of the effective symbol having the 64 samples and the guard interval having the 8 samples. A symbol period $T_{symbol}$ is, for example 1.953 microseconds, a sample period $T_{sample}$ is, for example, 27.127 nanoseconds, and a sample frequency $f_{sample}$ is, for example, 36.864 MHz.

In the OFDM method, since data is separately transmitted with a plurality of sub carriers, the time required to one symbol becomes long. Because the guard interval is provided in the time axis, the data is unlikely to be affected by jitter and multi-paths. The guard interval is set to have a length about 10% to 20% of that of the effective symbol.

In the OFDM method, it is required that the effective symbol be taken out of a continuous receiving signal in FFT in demodulation and FFT be applied. Even if an error occurs due to jitter in taking out the effective symbol, since the guard interval is provided, the frequency components do not change and only a phase difference is generated. Therefore, demodulation is possible by performing phase compensation with a known pattern being inserted into a signal, or by eliminating the phase difference with the use of differential coding. In a usual QPSK modulation only, timing should be adjusted for each bit. In the OFDM method, the sensitivity deteriorates by only several decibels even with a several-bit shift and demodulation is possible.

In FIG. 8, the output of the parallel/serial conversion circuit 15 is sent to a terminal 16A of a switch circuit 16. The output of a maximum-length-code (M-sequence) generating circuit 31 is sent to a terminal 16B of the switch circuit 16.

The output of the switch circuit 16 is sent to a frequency conversion circuit 17. The frequency conversion circuit 17 receives a local oscillation signal from a PLL synthesizer 18. The signal to be transmitted is converted to a signal having the specified frequency in the frequency conversion circuit 17. It is considered that the 2.4-GHz band, which is in a lower-frequency portion of the microwave band, the 5.7-GHz band, and the 19-GHz band are, for example, used as transmission frequencies.

The output of the frequency conversion circuit 17 is sent to a power amplifier 19. The power amplifier 19 power-amplifies the signal to be transmitted. The output of the power amplifier 19 is sent to a terminal 20A of a switch circuit 20. The switch circuit 20 switches at transmission and at receiving. The switch circuit 20 is switched to the terminal 20A side in data transmission. The output of the switch circuit 20 is sent to an antenna 21.

A received signal at the antenna 21 is sent to the switch circuit 20. The switch circuit 20 is switched to the terminal 20B side in data receiving. The output of the switch circuit 20 is amplified through a low noise amplifier (LNA) 22 and then sent to a frequency conversion circuit 23.

The frequency conversion circuit 23 receives a local oscillation signal from the PLL synthesizer 18, and converts the received signal to an intermediate-frequency signal. The output of the frequency conversion circuit 23 is sent to a serial/parallel conversion circuit 24. The output of the serial/parallel conversion circuit 24 is sent to an FFT circuit 25. The output of the FFT circuit 25 is sent to a parallel/serial conversion circuit 26.

The serial/parallel conversion circuit 24, the FFT circuit 25, and the parallel/serial conversion circuit 26 perform demodulation in the OFDM method. The serial/parallel conversion circuit 24 takes out effective data, samples the received waveform at an interval $f_0$, and coverts to parallel data. The output of the serial/parallel conversion circuit 24 is sent to the FFT circuit 25. The FFT circuit 25 converts the signal in the time domain to a signal in the frequency domain. Demodulation in the OFDM method is performed in this way by applying FFT to the waveform sampled at the interval $f_0$.

The output of the parallel/serial conversion circuit 26 is sent to a DQPSK demodulation circuit 27. The DQPSK demodulation circuit 27 performs DQPSK demodulation processing. The output of the DQPSK demodulation circuit 27 is sent to the communication controller 11. The communication controller outputs the received data.

A controller 28 controls the whole operations. According to directions from the controller 28, the communication controller 11 controls data transmission and data receiving.

As described above, in this system, data is transmitted in units of frames in the TDMA method. The M-sequence code for acquiring synchronization is sent as one symbol at the top of a frame. To implement such control, the radio communication unit 105 in the radio communication control terminal 102 is provided with the M-sequence generating circuit 31, a resource information memory 30, and a timer 29. At the timing of the symbol at the top of a frame, the switch circuit 16 is switched to the terminal 16B side. With this operation, a one-symbol M sequence is transmitted at the timing of the top of the frame.

When a transmission request is sent from the radio communication units 104A, 104B, . . . in the radio communication terminals 101A, 101B, . . . , the transmission request is received at the antenna 21, OFDM-demodulated in the FFT circuit 25, DQPSK-demodulated in the DQPSK demodulation circuit 27, and sent to the communication controller 11. The demodulated received data is sent from the communication controller 11 to the controller 28.

The controller 28 is provided with the resource information memory 30. This resource information memory 30 stores resource information related to the time period in a frame assigned to each of the radio communication terminals 101A, 101B . . . The controller 28 determines the time period assigned to each of the radio communication terminals 101A, 101B, . . . for transmission according to the received transmission request and the remaining communication resources. The controller 28 sends control information for this transmission assignment to the communication controller 11. Data sent from the communication controller 11 is DQPSK-modulated in the DQPSK modulation circuit 12, OFDM-converted in the IFFT circuit 14, and transmitted from the antenna 21 to the radio communication units 104A and 104B in the radio communication terminals 101A and 101B.

Figure 12:
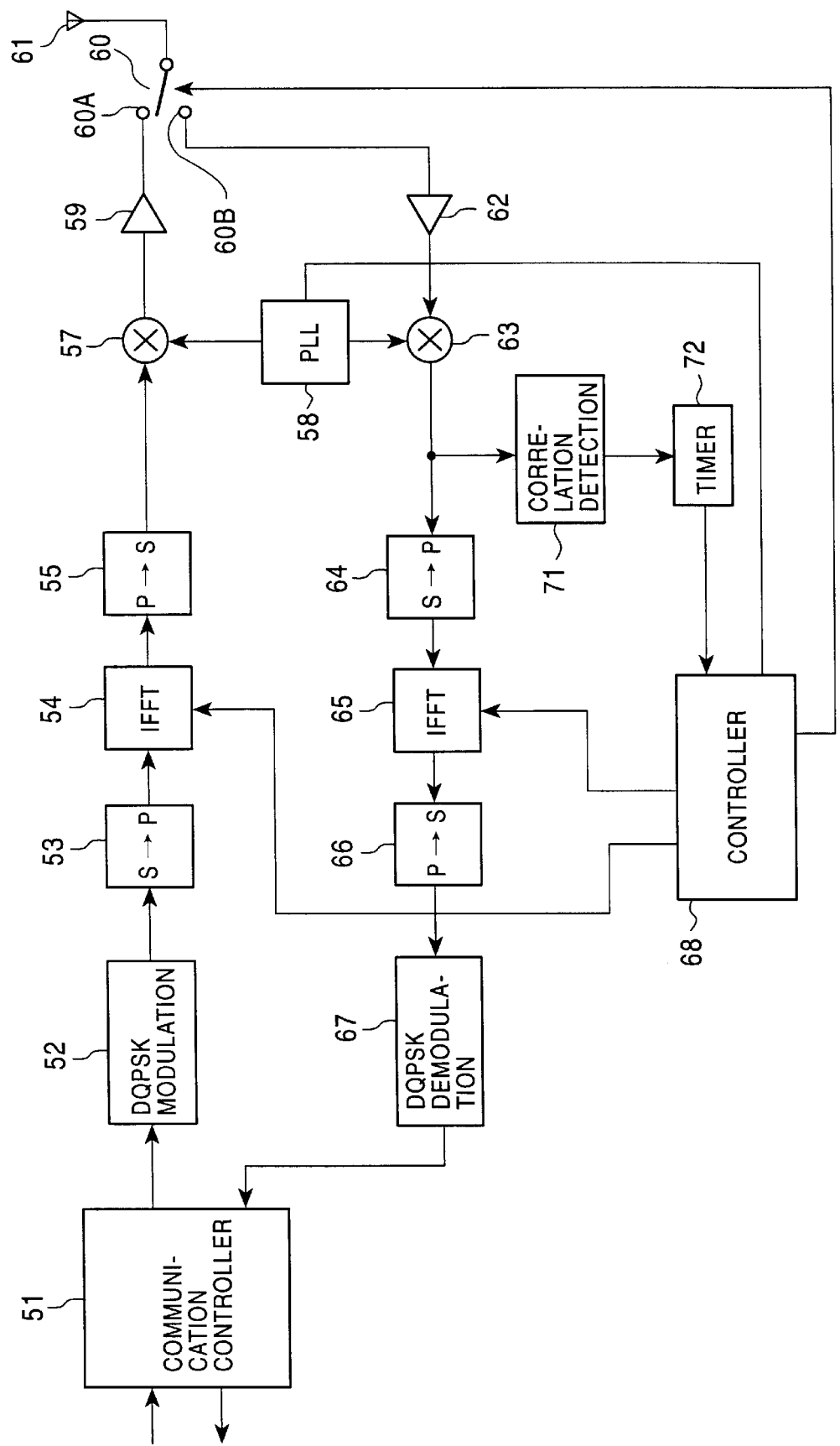
FIG. 12 is a block diagram showing a configuration of a radio communication unit in a radio communication terminal.

FIG. 12 shows a configuration of the radio communication units 104A, 104B, . . . of the radio communication terminals 101A, 101B . . . In FIG. 12, the data to be transmitted is input through a communication controller 51. The data to be transmitted, sent from the controller 51, is supplied to a DQPSK modulation circuit 52. The DQPSK modulation circuit 52 modulates the data to be transmitted by DQPSK.

The output of the DQPSK modulation circuit 52 is sent to a serial/parallel conversion circuit 53. The serial/parallel conversion circuit 53 converts serial data to parallel data. The output of the serial/parallel conversion circuit 53 is sent to an IFFT circuit 54. The IFFT circuit 54 performs mapping from the data to be transmitted to data in the frequency domain, and applies inverse Fourier transform to convert to data in the time domain. The output of the IFFT circuit 54 is sent to a parallel/serial conversion circuit 55. The serial/parallel conversion circuit 53, the IFFT circuit 54, and the parallel/serial conversion circuit 55 convert to a multi-carrier signal by the OFDM method.

The output of the parallel/serial conversion circuit 55 is sent to a frequency conversion circuit 57. The frequency conversion circuit 57 receives a local oscillation signal from a PLL synthesizer 58. The signal to be transmitted is converted to a signal having the specified frequency in the frequency conversion circuit 57.

The output of the frequency conversion circuit 57 is sent to a power amplifier 59. The power amplifier 59 power-amplifies the signal to be transmitted. The output of the power amplifier 59 is sent to a terminal 60A of a switch circuit 60. The switch circuit 60 is switched to the terminal 60A side in data transmission. The output of the switch circuit 60 is sent to an antenna 61.

A received signal at the antenna 61 is sent to the switch circuit 60. The switch circuit 60 is switched to the terminal 60B side at data receiving. The output of the switch circuit 60 is amplified through an LNA 62 and then sent to a frequency conversion circuit 63. The frequency conversion circuit 63 receives a local oscillation signal from the PLL synthesizer 68, and converts the received signal to an intermediate-frequency signal. The output of the frequency conversion circuit 63 is sent to a correlation detecting circuit 71 as well as to a serial/parallel conversion circuit 64.

The output of the serial/parallel conversion circuit 64 is sent to an FFT circuit 65. The output of the FFT circuit 65 is sent to a parallel/serial conversion circuit 66. The serial/parallel conversion circuit 64, the FFT circuit 65, and the parallel/serial conversion circuit 66 perform demodulation in the OFDM method.

The output of the parallel/serial conversion circuit 66 is sent to a DQPSK demodulation circuit 67. The DQPSK demodulation circuit 67 performs DQPSK demodulation processing. The output of the DQPSK demodulation circuit 67 is sent to the communication controller 51. The communication controller 51 outputs the received data.

A controller 68 controls the whole operations. According to directions from the controller 68, the communication controller 51 controls data transmission and data receiving.

As described above, in this system, data is transmitted in units of frames in the TDMA method. The M-sequence code for acquiring synchronization is sent as one symbol at the top of a frame from the radio communication unit 105 in the radio communication control terminal 102. To implement such control, the radio communication units 104A, 104B, . . . are provided with the correlation detecting circuit 71 and a timer 72.

At the timing of the top of a frame, the M sequence sent from the radio communication unit 105 in the radio communication control terminal 102 is received at the antenna 61 and sent to the correlation detecting circuit 71. The correlation detecting circuit 71 detects the correlation between the received code and the code specified in advance. When it is determined that the correlation is high, a correlation detection signal is output. The correlation detecting circuit 71 can be implemented, for example, by a matched filter. The output of the correlation detecting circuit 71 is sent to a timer 72. The time in the timer 72 is set according to a correlation detection signal sent from the correlation detecting circuit 71.

When data is to be transmitted, the communication controller 51 sends a transmission request according to a command from the controller 68. This transmission request is DQPSK-modulated in the DQPSK modulation circuit 52, OFDM-converted in the IFFT circuit 54, and transmitted from the antenna 61 toward the radio communication control terminal 102. The radio communication control terminal 102 receives the transmission request and returns control information, including a transmission assignment time.

This control information is received at the antenna 61, OFDM-demodulated in the FFT circuit 65, DQPSK-demodulated in the DQPSK demodulation circuit 67, and sent to the communication controller 51. The demodulated received data is sent from the communication controller 51 to the controller 68.

This control information includes information related to transmission times. These times are set with the time in the timer 72 being used as the reference. The timer 72 has been set according to the timing of the M sequence sent from the radio communication control terminal, which is output from the correlation detecting circuit 71.

When the timer 72 determines that the transmission start time has come, the communication controller 51 outputs the data to be transmitted according to a command from the controller 68. The data to be transmitted is DQPSK-modulated in the DQPSK modulation circuit 52, OFDM-converted in the IFFT circuit 54, and output from the antenna 21. When the timer 72 determines that the receiving time has come, the FFT circuit 65 performs demodulation processing for the received data according to a command from the controller 68.

In the above case, the radio communication control terminal 102 is provided separately for the radio communication terminals 101A, 101B, . . . The configuration is not limited to that in this case. Any of the radio communication terminals 101A, 101B, . . . may have the function of the radio communication control terminal 102 if a sufficient capability is provided.

In the above case, information data is transmitted and received with one-to-one correspondence. The configuration is not limited to that in this case. For example, information data transmitted from the radio communication unit 104A may be received at the same time by a plurality of units, such as the radio communication unit 104B and the radio communication units 104C, 104D, . . . not shown. In this case, the end of receiving may differ among the radio communication units 104A, 104B, . . .

What is claimed is:

1. A radio communication system comprising:
   a plurality of radio communication means each having transmitting means and receiving means; and
   radio communication control means having controlling means, transmitting means, and receiving means for controlling communications performed by said plurality of radio communication means, wherein information data including at least one of asynchronous data and isochronous data is transferred by a radio signal over a radio communication path for communication among said plurality of said radio communication means, said radio signal having a frame configuration including a first transfer time region for transferring control data used for controlling said communication, and a second transfer time region for performing said communication among said plurality of said radio communication means and for transferring said information data, wherein each of said plurality of radio communication means transmits transmission-request information in said first transfer time region and said transmission-request information includes identification information indicating whether the information data is one of asynchronous data and isochronous data, and said radio communication control means transmits in said first transfer time region as part of said control data assignment information indicating one of the transmission and a receiving timing within said second transfer time region for the information data of each of said plurality of said radio communication means, and a M-sequence code for acquiring synchronization to be used as a timing reference by said plurality of said radio communication means to detect one of said transmission and said receiving timing for said information data.

2. The radio communication system according to claim 1, wherein said first transfer time region is shared in time-division multiplexing by said radio communication control means and said plurality of said radio communication means and said second transfer time region is shared in time-division multiplexing by said plurality of said radio communication means.

3. The radio communication system according to claim 1, wherein said transmission-request information includes address information of the radio communication means serving as a transmission source and address information of the radio communication means serving as a transmission destination.

4. The radio communication system according to claim 3, wherein said transmission-request information includes information related to one of said amount of the information data to be transmitted, and communication-rate information.

5. A transmitting apparatus for transmitting information data including at least one of asynchronous data and isochronous data in units of frames, comprising:

means for requesting information-data transmission by transmitting transmission-request information in a first time region of a frame and for transmitting information describing said information data in said first time region of a frame, wherein said transmission-request information includes identification information indicating whether the information data is one of asynchronous data and isochronous data;

means for receiving information indicating whether communication according to the request is allowed and if said communication is allowed, for receiving control information related to a second time region of the frame, in which said communication is allowed, said control information including assignment information indicating a transmission timing within said second time region for the information data, and an M-sequence code for acquiring synchronization to be used as a timing reference by said transmitting apparatus to detect said transmission timing for said information data; and means for transmitting said information data in the second time region of the frame according to said control information.

6. The transmitting apparatus according to claim 5, wherein said information data is asynchronous data.

7. The transmitting apparatus according to claim 5, wherein said information data is isochronous data.

8. The transmitting apparatus according to claim 5, wherein said information describing said information data is communication-rate information for said information data.

9. The transmitting apparatus according to claim 5, wherein said information describing said information data is information related to the amount of said information data.

10. A radio communication control apparatus for controlling information-data communication including at least one of asynchronous data and isochronous data performed in units of frames among a plurality of radio communication terminals, comprising:

means for receiving a transmission request of information data in the form of transmission-request data and for receiving information describing said information data in a first time region of a frame, wherein said transmission-request information in said first time region includes identification information indicating whether the information data is one of asynchronous data and isochronous data;

determination means for determining whether transmission of said information data is allowed in a second time region of said frame, according to the received transmission request; and means for transmitting in said first time region control data including assignment information indicating one of a transmission and a receiving timing within said second time region for the information data of each of said plurality of said radio communication terminals, and an M-sequence code for acquiring synchronization to be used as a timing reference by said plurality of said radio communication terminals to detect one of said transmission and said receiving timing for said information data, if said transmission is allowed according to the determination result of said determination means, and if said transmission is not allowed, for transmitting information to that effect.

11. The radio communication control apparatus according to claim 10, wherein said information data is asynchronous data.

12. The radio communication control apparatus according to claim 10, wherein said information data is isochronous data.

13. The radio communication control apparatus according to claim 10, wherein information describing said information data is communication-rate information for said information data.

14. The radio communication control apparatus according to claim 10, wherein said information describing said information data is amount information for said information data.

15. A radio communication method used between a plurality of radio communication terminals and a radio communication control terminal for controlling radio communication, comprising the steps of;

transferring, when communication is performed among said plurality of radio communication terminals by a radio signal over a communication path, information data including at least one of asynchronous data and isochronous data in said radio signal, said radio signal having a frame configuration including a first transfer time region for transferring control data used for controlling said communication, and a second transfer time region for performing said communication among said plurality of said radio communication means and for transferring said information data, wherein said information data in said first transfer time region includes transmission-request information having identification information indicating whether the information data is one of asynchronous data and isochronous data; and transmitting, by said radio communication control terminal, in said first transfer time region as part of said control data assignment information indicating one of a transmission and a receiving timing within said second transfer time region for the information data of each of said plurality of said radio communication terminal, and an M-sequence code for acquiring synchronization to be used as a timing reference by said plurality of said radio communication terminals to detect one of said transmission and said receiving timing for said information data.

16. A transmitting method for transmitting information data including at least one of asynchronous data and isochronous data in units of frames, comprising the steps of:

requesting information-data transmission by transmitting transmission-request information in a first time region of a frame and transmitting information describing said information data in said first time region of a frame, wherein said transmission-request information includes identification information indicating whether the information data is one of asynchronous data and isochronous data;

receiving information indicating whether communication according to the request is allowed and if said communication is allowed, receiving control information related to a second time region of the frame, in which transmission is allowed, said control information including assignment information indicating a transmission timing within said second time region for the information data, and an M-sequence code for acquiring synchronization to be sued as at timing reference by said transmitting apparatus to detect said transmission timing for said information data; and transmitting said information data in said second time region of the frame according to said control information.

17. A radio communication control method for controlling information-data communication including at least one of asynchronous data and isochronous data performed in units of frames among a plurality of radio communication terminals, comprising the steps of:

receiving a transmission request of said information data and receiving information describing said information data in a first time region of a frame, wherein said transmission request in the first time region includes identification information indicating whether the information data is one of asynchronous data and isochronous data;

determining whether transmission of said information data is allowed in a second time region of said frame, according to said received transmission request; and transmitting in said first time region control data including assignment information indicating one of a transmission and a receiving timing within said second time region for the information data of each of said plurality of said radio communication terminals, and an M-sequence code for acquiring synchronization to be sued as a timing reference by said plurality of said radio communication terminals to detect one of said transmission and said receiving timing for said information data, if said transmission is allowed according to the determination result of said determination step, and if said transmission is not allowed, transmitting information to that effect.

18. A transmitting method for transmitting information data including at least one of asynchronous data and isochronous data in units of frames, comprising the steps of:

requesting information-data transmission by transmitting transmission-request information in a first time region of a frame and transmitting information describing said information data in said first time region of a frame, wherein said transmission-request information includes identification information indicating whether the information data includes one of asynchronous data and isochronous data;

receiving information indicating whether communication according to the request is allowed and if said communication is allowed, receiving control information related to a second time region of the frame, in which transmission is allowed, said control information including assignment information indicating a transmission timing within said second time region for the information data, and a predetermined sequence for acquiring synchronization to be used as a timing reference by said transmitting apparatus to detect said transmission timing for said information data; and transmitting said information data in said second time region of the frame according to said control information.

19. A radio communication control method for controlling information-data communication including at least one of asynchronous data and isochronous data performed in units of frames among a plurality of radio communication terminals, comprising the steps of:

receiving a transmission request of said information data and receiving information describing said information data in a first time region of a frame, wherein said transmission request in the first time region includes identification information indicating whether information data includes one of asynchronous data and isochronous data;

determining whether transmission of said information data is allowed in a second time region of said frame, according to said received transmission request; and transmitting in said first time region control data including assignment information indicating one of a transmission and a receiving timing within said second time region for the information data of each of said plurality of said radio communication terminal, and a predetermined sequence for acquiring synchronization to be used as a timing reference by said plurality of said radio communication terminals to detect one of said transmission and said receiving timing for said information data, if said transmission is allowed according to the determination result of said determination step, and if said transmission is not allowed, transmitting information to that effect.

* * * * *